(12) United States Patent
Dillon (10) Patent No.: US 10,845,623 B2
(45) Date of Patent: Nov. 24, 2020

(54) EYEGLASS LENS HAVING A PLURALITY OF IMAGE-GENERATING CELLS

(71) Applicant: Stephen M. Dillon, Scottsdale, AZ (US)

(72) Inventor: Stephen M. Dillon, Scottsdale, AZ (US)

(*) Notice: Subject to any disclaimer, the term of this patent is extended or adjusted under 35 U.S.C. 154(b) by 189 days.

(21) Appl. No.: 15/974,633

(22) Filed: May 8, 2018

(65) Prior Publication Data

US 2018/0329230 A1    Nov. 15, 2018

Related U.S. Application Data

(60) Provisional application No. 62/503,967, filed on May 10, 2017.

(51) Int. Cl.
| | |
|---|---|
| *G02C 7/06* | (2006.01) |
| *G02C 7/08* | (2006.01) |
| *G02B 3/10* | (2006.01) |
| *G02C 7/10* | (2006.01) |
| *G02C 7/14* | (2006.01) |

(52) U.S. Cl.
CPC ............. *G02C 7/063* (2013.01); *G02B 3/10* (2013.01); *G02C 7/088* (2013.01); *G02C 7/10* (2013.01); *G02C 7/14* (2013.01)

(58) Field of Classification Search
CPC ... G02B 3/10; G02B 1/14; G02B 1/11; G02B 1/115; G02B 1/116; G02B 1/118; G02C 7/02; G02C 7/022; G02C 7/04; G02C 7/049; G02C 7/10; G02C 7/104; G02C 7/06; G02C 7/063; G02C 7/08; G02C 7/088; G02C 7/14
USPC ............ 351/159.41, 159.43, 159.73, 159.74, 351/159.24, 159.29, 159.3, 159.32
See application file for complete search history.

(56) References Cited

U.S. PATENT DOCUMENTS

| | | | |
|---|---|---|---|
| 4,934,792 A | 6/1990 | Tovi | |
| 6,231,183 B1 | 5/2001 | Dillon | |
| 7,443,608 B2 | 10/2008 | Dillon | |
| 9,244,201 B2 | 1/2016 | Dillon | |
| 2008/0273246 A1* | 11/2008 | Moliton | G02B 6/10 359/633 |
| 2018/0039096 A1* | 2/2018 | Shioya | G02C 7/049 |

FOREIGN PATENT DOCUMENTS

JP    WO 2016125808    *    8/2016    ............... G02C 7/04

* cited by examiner

*Primary Examiner* — Jie Lei
(74) *Attorney, Agent, or Firm* — Bennet K. Langlotz; Langlotz Patent & Trademark Works, LLC (57) ABSTRACT

Eyeglass lenses having a plurality of image-generating cells have a lens body formed of an optically-transmissive material, the lens body having an arcuate convex first surface, the lens body having an arcuate concave second surface, a reflective layer embedded within the lens body between the first and second surfaces, the reflective layer having an array of facets, and each facet of the reflective layer having a planar surface. Each of the facets may be a polygon. The reflective layer may be optically transmissive. The lens body may have a forward portion between the first surface and the reflective layer. The forward portion may have a plurality of cells, each cell being coextensive with an associated facet, each cell having the form of a plano-convex lens and mirror assembly adapted to receive parallel incoming rays and to focus the rays at a focal point beyond the first surface of the lens.

14 Claims, 8 Drawing Sheets

EYEGLASS LENS HAVING A PLURALITY OF IMAGE-GENERATING CELLS

CROSS-REFERENCE TO RELATED APPLICATION

This application claims the benefit of U.S. Provisional Patent Application No. 62/503,967 filed on May 10, 2017, entitled "Optical Lens," which is hereby incorporated by reference in its entirety for all that is taught and disclosed therein.

FIELD OF THE INVENTION

The present invention relates to optics, and more particularly to an eyeglass lens for eyeglasses or sunglasses.

BACKGROUND OF THE INVENTION

A lens is a transmissive optical device with curved sides that concentrates or disperses light rays by means of refraction. A spherical lens is a lens whose surface has the shape of a portion of the surface of a sphere. Some types of sunglasses employ spherical lenses with a partially reflective optical coating on the outside of the lenses that make the lenses appear like convex mirrors. The reflective coating can be a single layer of a deposited thin film of a suitable metal or can have several alternating layers of dielectric materials and/or metals. Conventional mirrored sunglasses cause each lens to act as a unitary one-way mirror, thereby reflecting a single image covering the entire lens.

In the sunglasses market there is an ongoing demand for novel and distinctive appearing products. Several examples are described in U.S. Pat. Nos. 4,934,792, 9,244,201, 7,443,608, and 6,231,183, which describe a variety of lens constructions that transmit light normally to the wearer, but present such things as embossed bas relief images of faces and figures, brushed metal finishes, or textured appearances to an observer. This is provided by embedding a partially reflective film within a lens having normal spherical front and rear surfaces. Consequently, light passing through the lens is unaffected as it passes through the reflective film regardless of the angle of incidence of a ray to the film. Rays reflected from the film are reflected based on the angle of the film, generating the appearance of a frosted, textured or other image as might be provided by any simple surface having a particular shape, contour or texture.

Existing systems are limited in the appearances they convey, and lack certain optical functions and the ability to generate images away from the lens. Therefore, a need exists for a new and improved eyeglass lens that reflects multiple copies of an image to an observer at different focal points. In this regard, the various embodiments of the present invention substantially fulfill at least some of these needs. In this respect, the eyeglass lens according to the present invention substantially departs from the conventional concepts and designs of the prior art, and in doing so provides an apparatus primarily developed for the purpose of reflecting multiple copies of an image to an observer at different focal points.

SUMMARY OF THE INVENTION

The present invention provides an improved eyeglass lens, and overcomes the above-mentioned disadvantages and drawbacks of the prior art. As such, the general purpose of the present invention, which will be described subsequently in greater detail, is to provide an improved eyeglass lens that has all the advantages of the prior art mentioned above.

To attain this, the preferred embodiment of the present invention essentially comprises a lens body formed of an optically-transmissive material, the lens body having an arcuate convex first surface, the lens body having an arcuate concave second surface, a reflective layer embedded within the lens body between the first and second surfaces, the reflective layer having an array of facets, and each facet of the reflective layer having a planar surface. Each of the facets may be a polygon. The reflective layer may be optically transmissive. The lens body may have a forward portion between the first surface and the reflective layer, and the forward portion may have a plurality of cells, each cell being coextensive with an associated facet, each cell having the form of a plano-convex lens and mirror assembly adapted to receive parallel incoming rays and to focus the rays at a focal point beyond the first surface of the lens. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

An embodiment of the eyeglass lens of the present invention is shown and generally designated by the reference numeral 10.

FIGS. 1-4 illustrate the improved eyeglass lens 10 of the present invention. More particularly, the eyeglass lens 10 is shown as an uncut blank. The eyeglass lens has a lens body 12 formed of an optically transmissive material in the current embodiment. The lens body has an arcuate convex first surface 14 on the front side of first lens element 16 and an arcuate concave second surface 18 on the backside of the second lens element 20. A reflective layer 22 is embedded within the lens body between the first and second lens elements 16 and 20, respectively, at interface 24. Interface 24 forms an array of facets 28 meeting at vertices 30. Each facet has a flat/planar surface 32. Reflective layer 22 highlights the facets 28 at interface 24 within the eyeglass lens 10 (within the lens body 12). In the current embodiment, each of the facets is a polygon arranged in a regular geometric array, and the reflective layer is optically transmissive. Although orthogonal squares are shown, any type of polygon can be used, including hexagons and a fractured tile appearance. Other facets might be used with curved boundaries, such as round facets.

Each facet is angularly disposed with respect to each adjacent facet by a selected angle, which is greater than or equal to 0.60° and less than or equal to 13° in the current embodiment to give the reflective layer a curved shape. The lens body can be a segment of a true sphere or a toric-shaped sphere. Each facet is approximately tangent to an arc path that defines a portion of the sphere such that a radial emanating from the geometric center of the spherical surface upon which the facet is placed intersects the geometric center of the facet at right angles. In one preferred embodiment, a facet having a width of 2 millimeters on the surface of a 6 base curve spherical lens having a radius of curvature of 88.3 millimeters, the facet will subtend 1.3° of the full sphere, so that the angular offset from an adjacent facet will be that amount.

Figure 1:
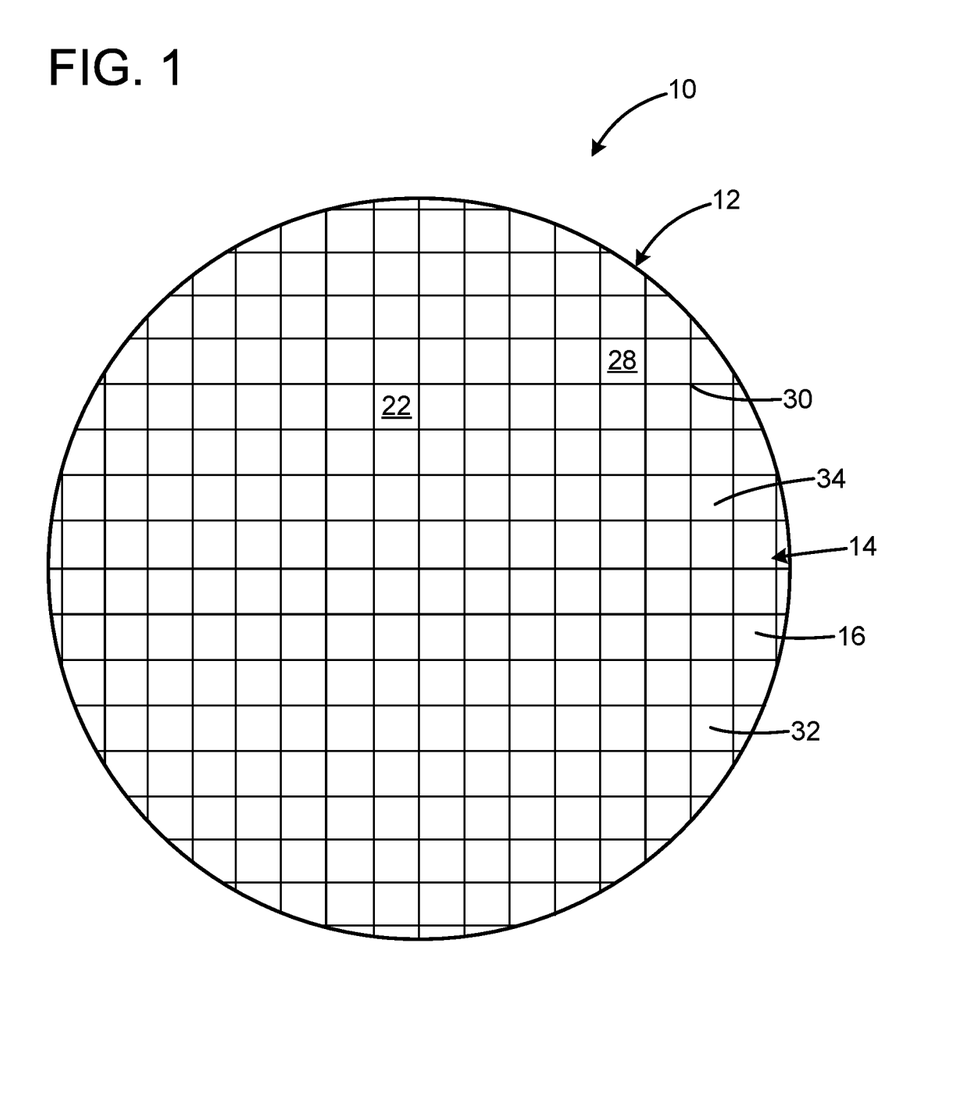
FIG. 1 is a front view of the current embodiment of the eyeglass lens blank constructed in accordance with the principles of the present invention.
Figure 2:
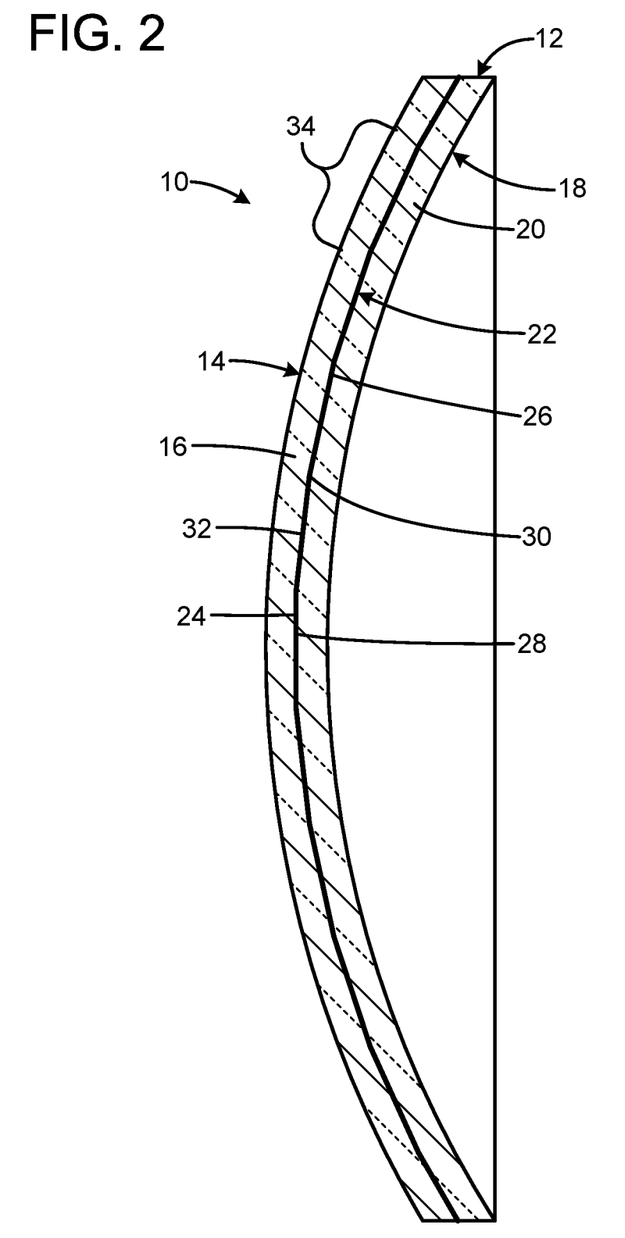
FIG. 2 is a side view of the eyeglass lens blank of FIG. 1 showing multiple planar segments.
Figure 3:
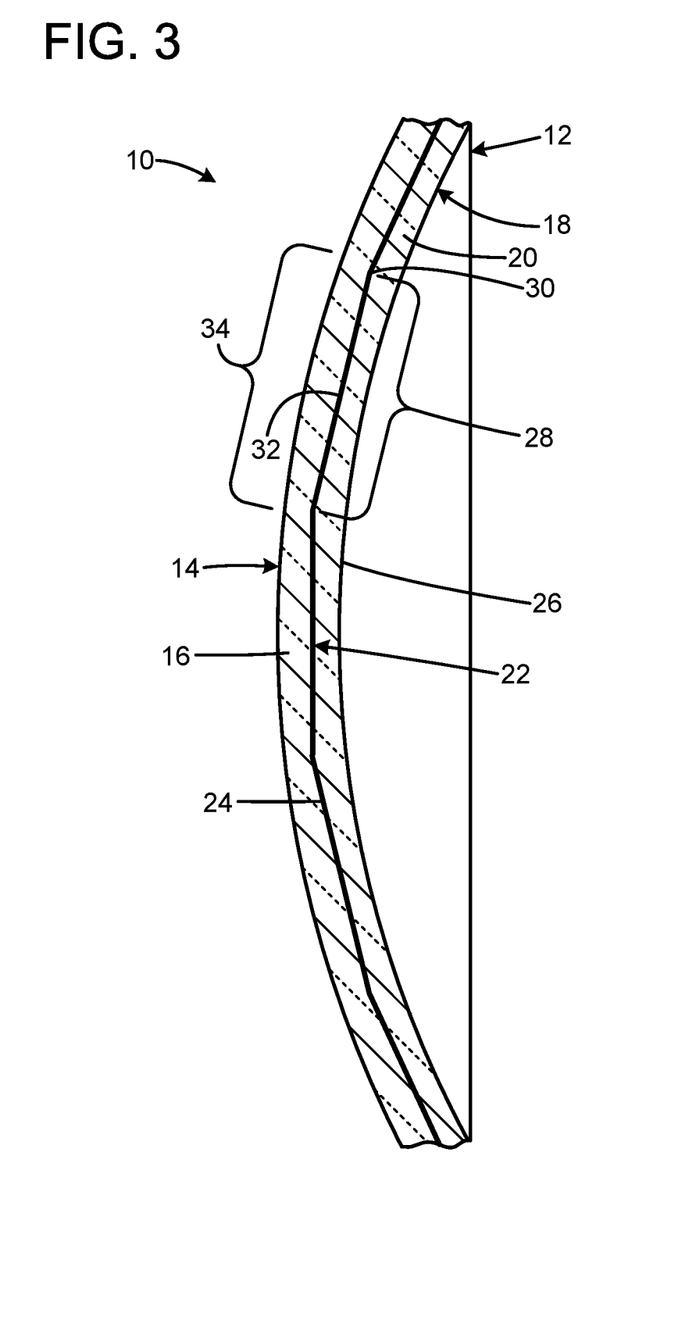
FIG. 3 is an enlarged partial view of the eyeglass lens of FIG. 1 showing multiple planar segments.
Figure 4:
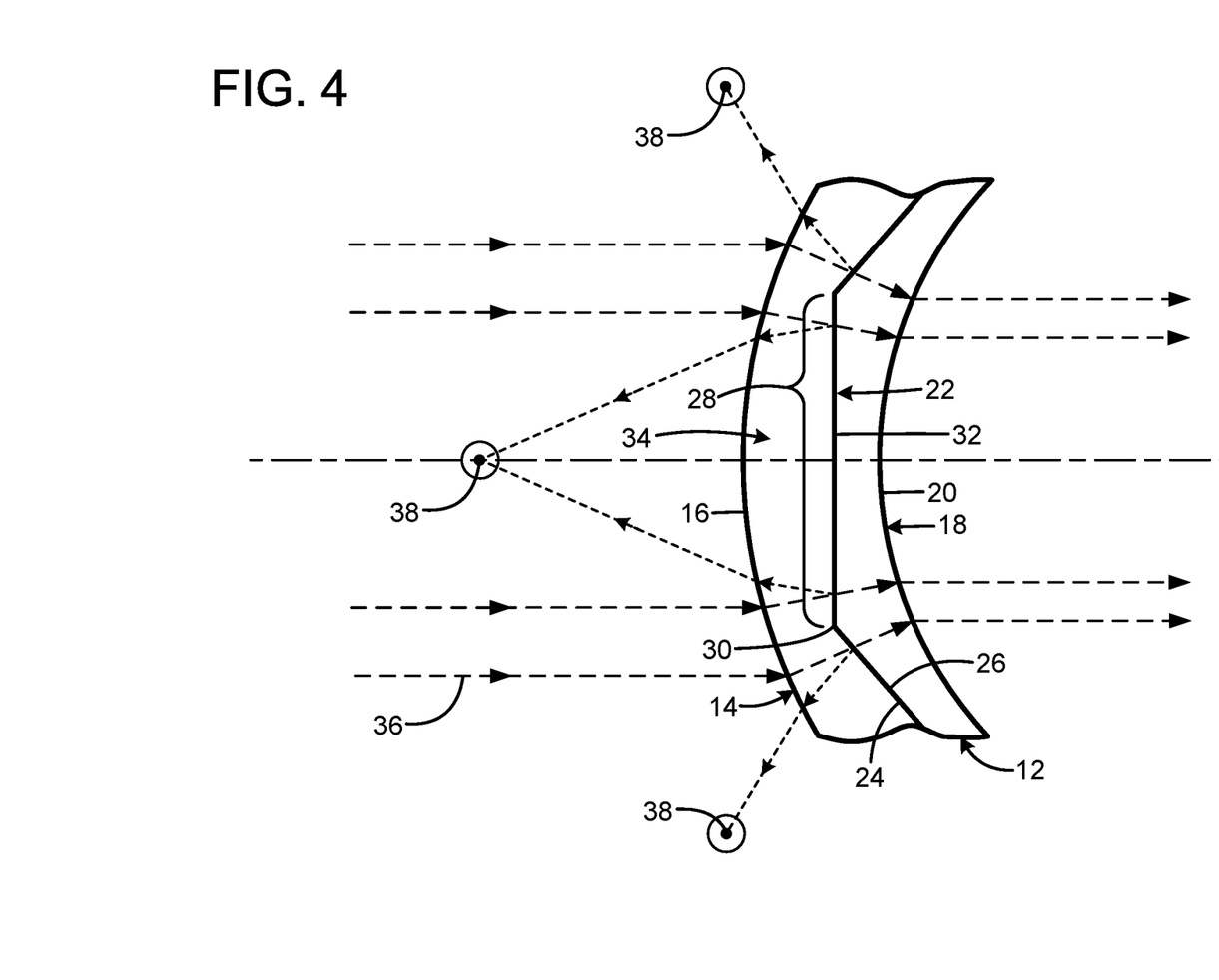
FIG. 4 is an enlarged partial view of the eyeglass lens of FIG. 1 showing how light passes through and reflects from a selected portion of the lens to a focal point.

The lens body 12 has a forward first lens element portion 16 between the first surface 14 and the reflective layer 22 that has a plurality of cells 34. Each cell is an optical element formed immediately above and coextensive with an associated facet 28. Each cell has a common thickness. In the current embodiment, each cell has the form of a plano-convex lens and mirror assembly adapted to receive parallel incoming light rays 36 and to focus at least a portion of the incoming light rays at a focal point 38 beyond (in front of) the first surface 14 of the lens as shown in FIG. 4 to create a real image of the field of view, visible to an observer (not shown). The appearance of this real image will depend on the relative position of the observer: if the observer is beyond the real image, it will appear different than if the observer is nearer than the image (in which case the image will not be formed, and the observer will see a different effect). When the observer's eye is at or near a real image, it will see a field of the same rays that originated from a common point or direction, generating a distinctive visual effect. The arrangement of the cells in a regular geometric array at different angles causes each cell to reflect to a different focal point. The distance in front of the first surface 14 that the focal point will be will depend on a number of variables including the spherical radius of the first surface 14 and the refractive index of the material used to created first lens element 16.

For illustrative purposes, in the current embodiment, first surface 14 of FIG. 4 has a spherical radius of 88.3 millimeters and the first lens element 16 has a refractive index of 1.5. Based on conventional optical calculations of a biconvex lens the focal point 38 of a cell 34 is greater than 84 millimeters and less than 95 millimeters from the first surface. This is based on conventional optical calculations of a biconvex lens having the same base curvature as the illustrated embodiment. The radius of curvature of the first surface 14 of the preferred embodiment can range from 48 millimeters to 265 millimeters. The focal point 38 can range from 47 millimeters to 265 millimeters.

The first surface 14 has a radius of curvature greater than or equal to 48 millimeters (base 11) and less than or equal to 265 millimeters (base 2), and, depending on the refractive index of the first lens element, the focal point distance from the first surface is thus 0.8 to 1.13 times the radius of curvature of the first surface 14.

A portion of the incoming light rays 36 is transmitted through the reflective layer 22 and the second surface 18 so the transmitted portion of the incoming light rays is visible to a wearer (not shown) of the eyeglass lens 10 and appears as any non-corrective lens without any perception of or effect by the faceted patter. However, the reflective layer of the invention is also suitable for use with a corrective eyeglass lens that does focus incoming light rays transmitted through the reflective layer and the second surface, simply by employing front and or rear surfaces (14 or 18) with different curved shapes from each other as is conventionally employed for corrective lenses. The refractive index of the material used to make first lens element 16 and second lens element 20 are closely matched to each other, so there is little to no distortion when light passes between them. The thickness of lens 10, including the first and second lens elements 16 and 20, is greater than or equal to 1 millimeter thick and less than or equal to 20 millimeters thick in the current embodiment.

Figure 7:
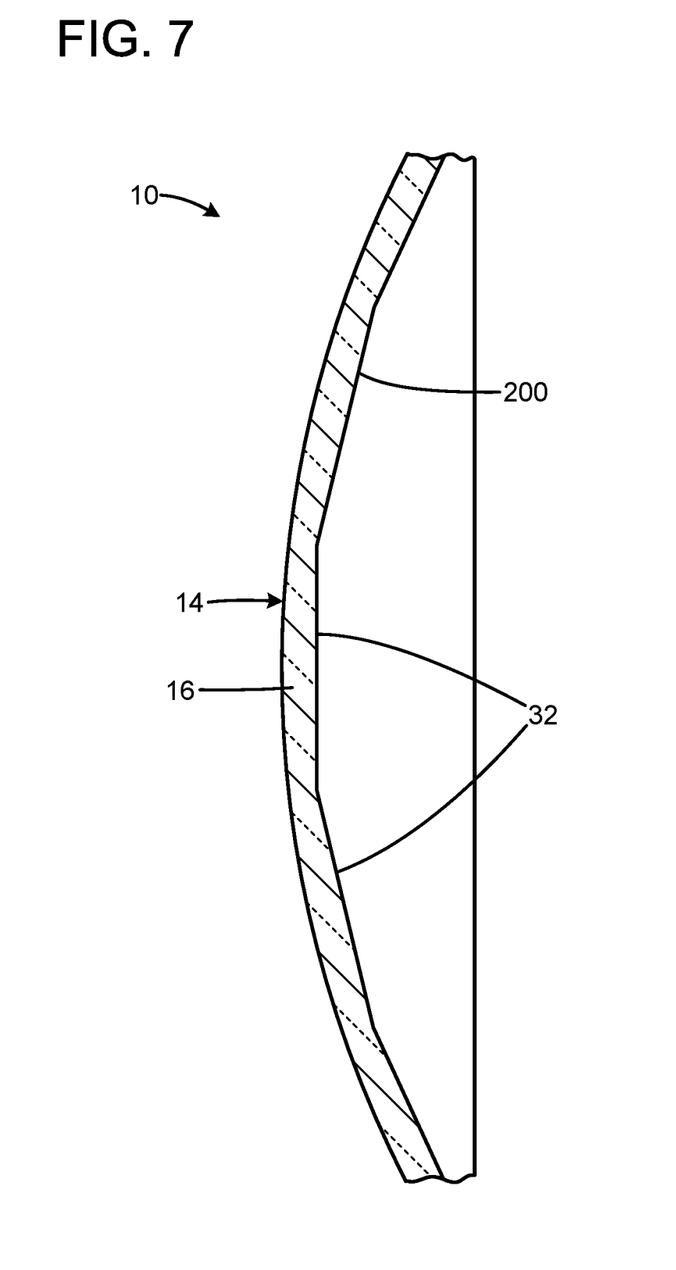
FIG. 7 is a side view of the first lens element of FIG. 1 before the application of the reflective layer of FIG. 1.

Two methods of manufacture of the eyeglass lens 10 are presently contemplated. In the first method, the first lens element 16 is formed by casting, molding, or other means creating facets on the concave side 100 (shown in FIG. 7). Reflective layer 22 is applied to surface 200 of the first lens element 16 (shown in FIG. 8). Subsequently, the second lens element 20 is applied to the reflective layer 22 in liquid form and then solidified thermally or by radiation (ultraviolet light) to achieve the lens construction illustrated in FIGS. 1-3. The second lens element 20 fills in the valleys created by the planar surfaces 32 of the facets 28 and provides a concave second surface 18 that is congruent to the first surface 14, thus allowing light to pass through the first and second surfaces of the lens body 12 generally undistorted.

Figure 8:
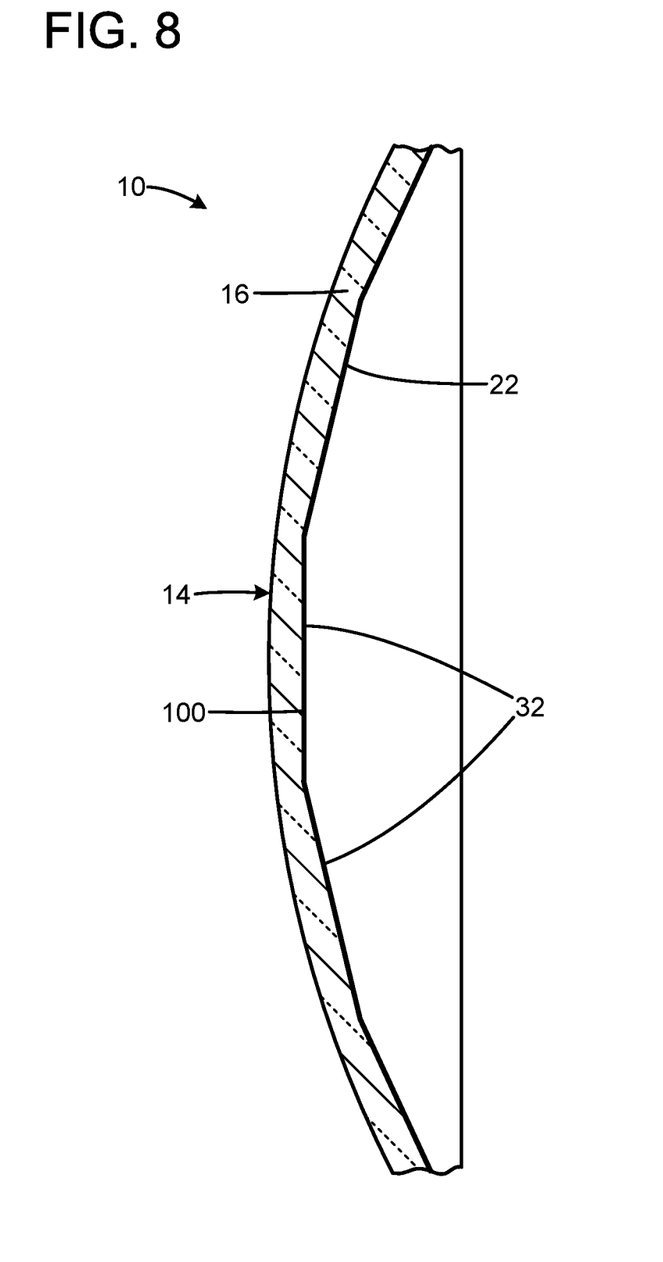
FIG. 8 is a side view of the first lens element of FIG. 1 after the application of the reflective layer of FIG. 1.

In the second method, reflective layer 22 is initially applied to surface 200 of the first lens element 16 (shown in FIG. 8). Subsequently, a solid state second lens element 20 having a concave surface 18, designed to be congruent to surface 14, is bonded to the reflective layer by means of an optical adhesive that has a refractive index that closely matches that of the first lens element 16. The optical adhesive fills in the valleys created by the planar surfaces 32 of the facets 28, thus allowing light to pass through the first and second surfaces of the lens body 12 generally undistorted.

Figure 5:
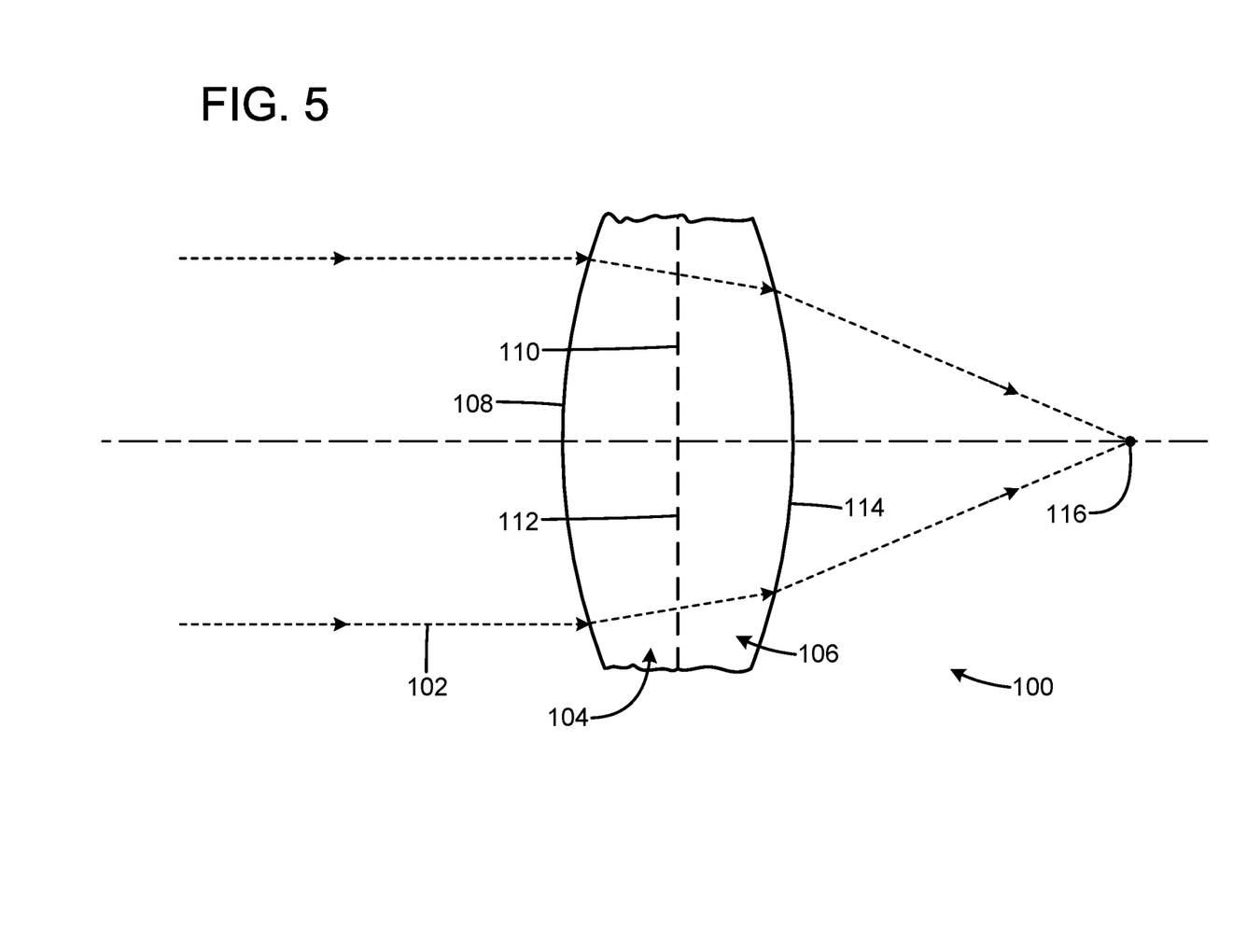
FIG. 5 is a side partial view of an analogy of the eyeglass lens of FIG. 1 showing how light is reflected by the lens to a focal point.

FIG. 5 illustrates an analogy to the improved eyeglass lens 10 of the present invention. More particularly, a lens system 100 is shown that has the equivalent effect on incoming parallel light rays 36 as does a cell 34 of the lens body 12 when the incoming parallel light rays are reflected by the reflective layer 22. In the lens system 100, incoming parallel light rays 102 are transmitted through a first forward lens 104 and an abutting second rear lens 106, which is a mirror image of the first lens. The first lens has a convex front surface 108 and a flat rear surface 110. The second lens has a flat front surface 112 and a concave rear surface 114. As a result, the incoming parallel light rays are focused to a focal point 116 after being transmitted through the two lenses.

Figure 6:
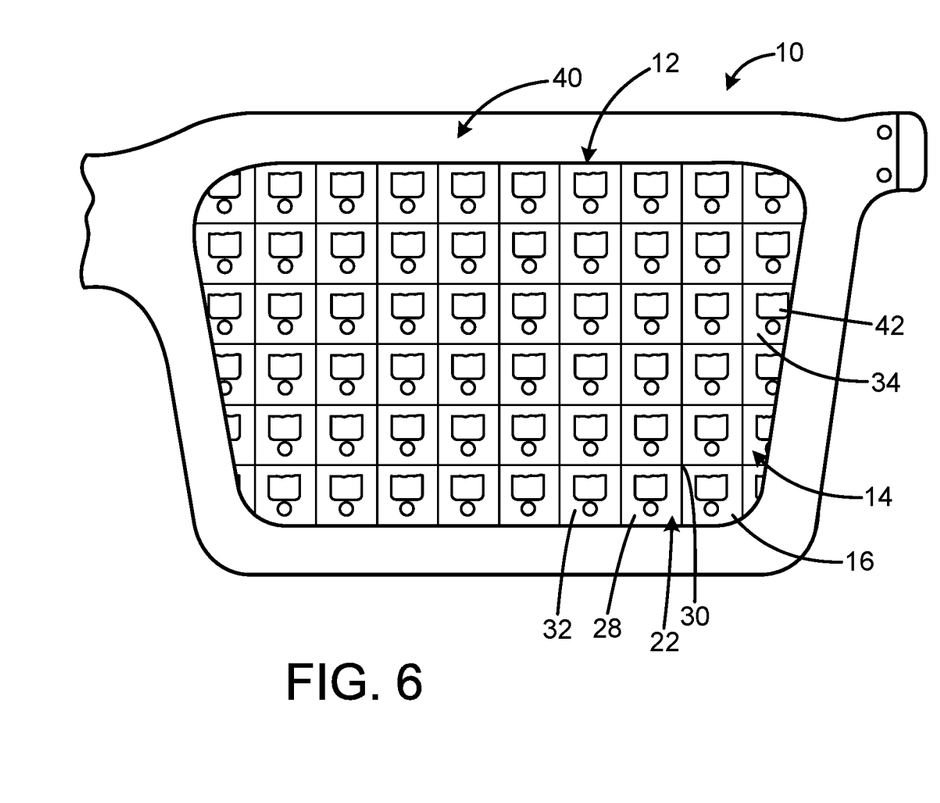
FIG. 6 is a front view of the eyeglass lens blank of FIG. 1 cut to fit an eyeglass frame showing how light reflects from the entire lens to form multiple inverted images at different focal points.

FIG. 6 illustrates the improved eyeglass lens 10 of the present invention. More particularly, the eyeglass lens is shown cut and installed in eyeglass frames 40. Incoming parallel light rays are shown reflecting from the entire lens body 12 to form multiple inverted images 42, one per cell 34, as it would appear when viewed by an observer beyond the focal points of the cells. Each of the inverted images is focused at a different focal point 38, which creates an unusual aesthetic effect for an observer. In the example, the head and shoulders of the observer are shown in simplified form for illustration. In fact, the ones on axis with or perpendicular to a line connecting the lens to the observer's eye will show the observer's eye at the center of each facet, and the observer's image will be shifted laterally away from this cell based on the angle of the rays striking a more peripheral cell. Because the refractive index of the material used to create the first lens element 16 is higher than that of air, the front 16 of the lens body 12 is spherical, and each of the facets 28 of the reflective layer 22 has a planar surface 26, the light being reflected from each of the planar surfaces is flipped backwards and upside down and focused at a different focal point. Each facet may be considered a positive lens.

This disclosure includes certain numerical quantities that are believed correct, but are derived by calculation and not measurement. Where there may be inconsistencies due to errors, an inconsistent quantity may be ignored, and the actual quantity that may be freshly derived from another disclosed quantity considered correct and part of the disclosed technology.

While a current embodiment of an eyeglass lens has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, the planar surfaces do not need to touch or connect as described. For example, a single flat can form a complete secant plane that cuts across the spherical surface of the first surface, thereby creating a planar surface in the shape of circle or an elliptical shape depending on whether the sphere is a true sphere or an elliptical shaped sphere, respectively. Multiple planar surfaces can also be formed on the spherical surface where each planar surface does not contact another planar surface, thus creating a polka dot-type pattern visible to an observer.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An eyeglass lens comprising:
   a lens body formed of an optically-transmissive material;
   the lens body having an arcuate convex first surface;
   the lens body having an arcuate concave second surface;
   a reflective layer embedded within the lens body between the first and second surfaces, the reflective layer formed of a partially transmissive and partially reflective material having a different optical quality from that of the lens body;
   the reflective layer having an array of more than three facets extending over a major portion of the lens; and
   each facet of the reflective layer having a planar surface angularly offset from a planar surface of an adjacent facet.

2. The eyeglass lens of claim 1 wherein each of the facets is a polygon.

3. The eyeglass lens of claim 1 wherein the reflective layer is optically transmissive.

4. The eyeglass lens of claim 1 wherein the lens body has a forward portion between the first surface and the reflective layer, and the forward portion has a plurality of cells, each cell being coextensive with an associated facet, each cell having the form of a plano-convex lens and mirror assembly adapted to receive parallel incoming rays and to focus the rays at a focal point beyond the first surface of the lens.

5. The eyeglass lens of claim 4 wherein the focal point is 48 millimeters to 265 millimeters from the first surface.

6. The eyeglass lens of claim 4 wherein focal point distance from the first surface is 0.8 to 1.13 times the radius of curvature of the first surface.

7. The eyeglass lens of claim 4 wherein each cell has a common thickness.

8. The eyeglass lens of claim 1 wherein the facets are arranged in a regular geometric array.

9. The eyeglass lens of claim 1 wherein each facet is angularly disposed with respect to each adjacent facet by a selected angle.

10. The eyeglass lens of claim 1 wherein the reflective layer has a curved shape.

11. An eyeglass lens comprising:
    a lens body formed of an optically-transmissive material;
    the lens body having an arcuate convex first surface;
    the lens body having an arcuate concave second surface;
    a reflective layer embedded within the lens body between the first and second surfaces;
    the reflective layer having an array of facets;
    each facet of the reflective layer having a planar surface;
    the lens body having a forward portion between the first surface and the reflective layer;
    the forward portion having a multitude of cells;
    each cell being coextensive with an associated facet, each cell having the form of a plano-convex lens and mirror assembly adapted to receive parallel incoming rays and to focus the rays at a focal point beyond the first surface of the lens.

12. The eyeglass lens of claim 11 wherein the focal point is 48 millimeters to 265 millimeters from the first surface.

13. The eyeglass lens of claim 11 wherein focal point distance from the first surface is 0.8 to 1.13 times the radius of curvature of the first surface.

14. The eyeglass lens of claim 11 wherein each cell has a common thickness.

* * * * *